KARL LIEBER, OF CHARLOTTENBURG, NEAR BERLIN, PRUSSIA, ASSIGNOR TO E. J. KEFERSTEIN, OF WASHINGTON, DISTRICT OF COLUMBIA.

Letters Patent No. 85,015, dated December 15, 1868.

IMPROVED MODE OF PREPARING CARBONATED AND CAUSTIC ALKALIES, &c.

The Schedule referred to in these Letters Patent and making part of the same.

*To all whom it may concern:*

Be it known that I, KARL LIEBER, of Charlottenburg, near Berlin, in the Kingdom of Prussia, have discovered a new and improved Mode of Preparing Caustic Alkalies, viz, potassa and soda, or the respective carbonates of them, and obtaining other useful products; and I do hereby declare that the following is a full and exact description of my process or discovery.

The nature of my discovery consists in heating together soda or potassa, saltpetre, and carbonate of lime, or chalk.

To enable others skilled in the art to use my invention, I will proceed to describe more minutely the operation.

Five hundred pounds of Chili saltpetre, or nitrate of soda, are heated together with seven hundred pounds of chalk, either in an iron retort or muffle-furnace, whence, by double-elective affinity, carbonate of soda and nitrate of lime are formed, which latter, however, at once is further decomposed into caustic lime, nitrous acid, and oxygen-gas. These gaseous products are passed through and collected in a series of (fifteen to twenty) stone jars, each being charged with some water.

The residue in the retort or furnace, consisting of carbonate of soda and caustic lime, may, when cold, be extracted with water, which dissolves carbonate of soda, leaving behind caustic lime, or the same may, by boiling with steam, be resolved into caustic soda and carbonate of lime, in which case the carbonate of lime can again be employed, whilst the soda-solution has only to be concentrated, or evaporated to dryness, in order to furnish concentrated lye, or dry caustic soda.

In this manner I not only procure all the soda in Chili saltpetre, but, also, about two-thirds of the nitric acid contained therein, all at a comparatively small expense for fuel.

In order to prepare caustic potash and its carbonate, it becomes only necessary to substitute, in proper proportion, potassa-saltpetre for soda-saltpetre, in the process above described.

What I claim as my discovery, and desire to secure by Letters Patent, is—

1. The manufacture of caustic and carbonated alkalies, in the manner substantially above described and set forth.

2. The production and collection of nitrous acid and oxygen, useful for the manufacture of nitric acid by the process described and set forth.

KARL LIEBER.

Witnesses:
A. KEFERSTEIN,
H. ERNI.